(12) United States Patent
Anadure et al.

(10) Patent No.: US 10,970,867 B2
(45) Date of Patent: *Apr. 6, 2021

(54) AUGMENTED REALITY DIGITAL CONTENT SEARCH AND SIZING TECHNIQUES

(71) Applicant: eBay Inc., San Jose, CA (US)

(72) Inventors: Preeti Patil Anadure, Fremont, CA (US); Mukul Arora, Santa Clara, CA (US); Ashwin Ganesh Krishnamurthy, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/930,882

(22) Filed: May 13, 2020

(65) Prior Publication Data
US 2020/0273195 A1   Aug. 27, 2020

Related U.S. Application Data

(63) Continuation of application No. 16/560,113, filed on Sep. 4, 2019, now Pat. No. 10,726,571, which is a (Continued)

(51) Int. Cl.
*G06T 7/60* (2017.01)
*G06F 16/532* (2019.01)
(Continued)

(52) U.S. Cl.
CPC ............ *G06T 7/60* (2013.01); *G06F 16/532* (2019.01); *G06F 16/5854* (2019.01);
(Continued)

(58) Field of Classification Search
CPC ......... G06T 19/20; G06T 19/006; G06T 7/60; G06T 2207/10016; G06T 2219/2016; G06K 9/00671; G06F 16/532
(Continued)

(56) References Cited

U.S. PATENT DOCUMENTS 6,075,532 A * 6/2000 Colleran .................. G09G 5/00
345/473
6,373,489 B1 * 4/2002 Lu ........................... G06T 17/20
345/428
(Continued)

FOREIGN PATENT DOCUMENTS

JP   2010-015228 A   1/2010
WO  2013/063299 A1  5/2013
(Continued)

OTHER PUBLICATIONS

U.S. Appl. No. 16/141,700, filed Sep. 25, 2018, Issued.
(Continued)

*Primary Examiner* — Mark K Zimmerman
*Assistant Examiner* — Jonathan M Cofino
(74) *Attorney, Agent, or Firm* — FIG. 1 Patents

(57) ABSTRACT

Techniques are described herein that overcome the limitations of conventional techniques by bridging a gap between user interaction with digital content using a computing device and a user's physical environment through use of augmented reality content. In one example, user interaction with augmented reality digital content as part of a live stream of digital images of a user's environment is used to specify a size of an area that is used to filter search results to find a "best fit". In another example, a geometric shape is used to represent a size and shape of an object included in a digital image (e.g., a two-dimensional digital image). The geometric shape is displayed as augmented reality digital content as part of a live stream of digital images to "assess fit" of the object in the user's physical environment.

20 Claims, 12 Drawing Sheets

Related U.S. Application Data continuation of application No. 16/141,700, filed on Sep. 25, 2018, now Pat. No. 10,573,019.

(51) Int. Cl.

| | | |
|---|---|---|
| *G06F 16/583* | (2019.01) | |
| *G06T 19/00* | (2011.01) | |
| *G06T 19/20* | (2011.01) | |
| *G06F 3/0482* | (2013.01) | |
| *G06K 9/00* | (2006.01) | |
| *G06F 3/0488* | (2013.01) | |

(52) U.S. Cl.
CPC ........ *G06K 9/00671* (2013.01); *G06T 19/006* (2013.01); *G06T 19/20* (2013.01); *G06F 3/0482* (2013.01); *G06F 3/04883* (2013.01); *G06T 2200/24* (2013.01); *G06T 2207/10016* (2013.01); *G06T 2207/10028* (2013.01); *G06T 2219/2016* (2013.01)

(58) Field of Classification Search
USPC .................................................. 345/428, 473
See application file for complete search history.

(56) References Cited

U.S. PATENT DOCUMENTS

| | | | | |
|---|---|---|---|---|
| 9,129,404 | B1* | 9/2015 | Wagner | G06Q 30/0643 |
| 9,495,399 | B1 | 11/2016 | Dow et al. | |
| 9,734,634 | B1 | 8/2017 | Mott et al. | |
| 10,573,019 | B1 | 2/2020 | Anadure et al. | |
| 10,726,571 | B2 | 7/2020 | Anadure et al. | |
| 2005/0273346 | A1 | 12/2005 | Frost | |
| 2010/0063788 | A1* | 3/2010 | Brown | G06T 19/00 703/6 |
| 2010/0321391 | A1 | 12/2010 | Rubin et al. | |
| 2011/0129118 | A1 | 6/2011 | Hagbi et al. | |
| 2012/0192235 | A1 | 7/2012 | Tapley et al. | |
| 2012/0206452 | A1* | 8/2012 | Geisner | H04S 7/304 345/419 |
| 2012/0299961 | A1* | 11/2012 | Ramkumar | G06T 19/006 345/632 |
| 2013/0097197 | A1 | 4/2013 | Rincover et al. | |
| 2014/0270477 | A1 | 9/2014 | Coon | |
| 2014/0285522 | A1* | 9/2014 | Kim | G06Q 30/0601 345/633 |
| 2015/0279071 | A1* | 10/2015 | Xin | G06T 9/40 345/440 |
| 2016/0300179 | A1 | 10/2016 | Aviles | |
| 2018/0082475 | A1 | 3/2018 | Sharma et al. | |
| 2018/0286126 | A1* | 10/2018 | Schwarz | G06T 19/006 |
| 2020/0043355 | A1* | 2/2020 | Kwatra | G06F 16/951 |
| 2020/0098123 | A1 | 3/2020 | Anadure et al. | |

FOREIGN PATENT DOCUMENTS

| | | |
|---|---|---|
| WO | 2016/114930 A2 | 7/2016 |
| WO | 2020/068517 A1 | 4/2020 |

OTHER PUBLICATIONS

U.S. Appl. No. 16/560,113, filed Sep. 4, 2019, Issued.
Amendment under 1.312 filed on Aug. 16, 2019 for U.S. Appl. No. 16/141,700, 8 pages.
Applicant Initiated Interview Summary received for U.S. Appl. No. 16/141,700, dated May 16, 2019, 3 pages.
Corrected Notice of Allowability received for U.S. Appl. No. 16/141,700, dated Nov. 27, 2019, 4 pages.
Non-Final Office action received for U.S. Appl. No. 16/141,700, dated Apr. 19, 2019, 20 pages.
Notice of Allowance received for U.S. Appl. No. 16/141,700, dated Jun. 26, 2019, 8 pages.
PTO Response to Rule 312 Communication received for U.S. Appl. No. 16/141,700, dated Sep. 5, 2019, 2 pages.
Response to Non-Final Office Action filed on May 31, 2019 for U.S. Appl. No. 16/141,700, dated Apr. 19, 2019, 17 pages.
Supplemental Notice of Allowability received for U.S. Appl. No. 16/141,700, dated Jan. 23, 2020, 4 pages.
International Written Opinion received for PCT Application No. PCT/US2019/051763, dated Dec. 30, 2019, 6 pages.
International Search Report received for PCT Application No. PCT/US2019/051763, dated Dec. 30, 2019, 2 pages.
Final Office Action received for U.S. Appl. No. 16/560,113, dated Jan. 8, 2020, 7 pages.
Non-Final Office action received for U.S. Appl. No. 16/560,113, dated Oct. 3, 2019, 7 pages.
Ong,"Amazon's App Now Lets You Place Items Inside Your Home Using AR", Retrieved from the Internet URL: https://www.theverge.com/2017/11/1/16590160/amazon-furniture-placement-ar-feature-too> entire document, Nov. 1, 2017, 2 pages.
Applicant Initiated Interview Summary received for U.S. Appl. No. 16/560,113, dated Dec. 26, 2019, 3 pages.
Corrected Notice of Allowability received for U.S. Appl. No. 16/560,113, dated Jun. 4, 2020, 2 pages.
Notice of Allowance received for U.S. Appl. No. 16/560,113, dated Mar. 4, 2020, 7 pages.
Response to Final Office Action filed on Feb. 24, 2020 for U.S. Appl. No. 16/560,113, dated Jan. 8, 2020, 7 pages.
Response to Non-Final Office Action filed on Dec. 31, 2019 for U.S. Appl. No. 16/560,113, dated Oct. 3, 2019, 12 pages.

\* cited by examiner

AUGMENTED REALITY DIGITAL CONTENT SEARCH AND SIZING TECHNIQUES

CLAIM OF PRIORITY

This application is a continuation of and claims priority to U.S. patent application Ser. No. 16/560,113, filed Sep. 4, 2019, entitled "Augmented Reality Digital Content Search and Sizing Techniques", which is a continuation of and claims priority to U.S. patent application Ser. No. 16/141,700, filed Sep. 25, 2018, which is now U.S. Pat. No. 10,573,019, entitled "Augmented Reality Digital Content Search and Sizing Techniques", the entire disclosures of which are hereby incorporated by reference herein in its entirety.

BACKGROUND

Service provider systems have been developed to support eCommerce, and through which, provide users with access to thousands and even millions of different products. Users, for instance, may use a computing device to access a service provider system via a network to purchase food, health products, appliances, furniture, sporting goods, vehicles, and so forth. This convenience has caused an explosion in growth of these systems to provide an ever-increasing range of products that may be of interest to the users.

Although these systems provide increased convenience and accessibility, these systems do face numerous challenges. A user, for instance, may view a product via a webpage of the service provider system. The webpage may include digital images of the product, provide a textual description of features of the product, and so forth to increase a user's knowledge regarding the product. This is done such that the user may make an informed decision regarding whether to purchase the product and thus increase a likelihood of the user in making the decision. However, a user's actual interaction with the product is limited, in that, the user is not able to determine how that product will "fit in" with the user's physical environment and contemplated use of that product within the environment. This is especially problematic with large and bulky items.

In one such example, a user may wish to purchase an item from a service provider system for use at a particular location within the user's home or office, e.g., a couch for viewing a television at a particular location in the user's living room, a kitchen appliance to fit on a corner of a countertop, a refrigerator to fit within a built-in area of a kitchen, a flat screen TV for use on a cabinet, and so forth. Conventional techniques used to determine this fit are generally based on dimensions specified in a product listing, which may not be available from a casual user. The user is then forced to make a best guess as to whether the product will fit as intended.

This is further complicated that in some instances, even though the product may fit within the contemplated area, dimension wise, the product may still not "seem right" to the user. A couch, for instance, may have a length that indicates it will fit between two end tables as desired by a user. However, the couch may have characteristics that make it ill-suited to that use, e.g., the arms on the couch may be too tall thereby making a top of the end tables inaccessible from the couch, the back too high to for a window behind the couch, and so forth. In such instances, the cost and hassle of returning the product, especially in instances in large and bulky items, may be significant and therefore cause the user to forgo use of service provider system altogether for such products. This causes the service provider system to fail for its intended purpose in making these products available to users.

SUMMARY

Augmented reality (AR) digital content search and sizing techniques and systems are described. These techniques overcome the limitations of conventional techniques by bridging a gap between user interaction with digital content using a computing device and a user's physical environment through use of augmented reality digital content. In one example, user interaction with augmented reality digital content as part of a live stream of digital images of a user's environment is used to specify a size of an area that is used to filter search results to find a "best fit". User inputs, for instance, may be used to select and manipulate a shape as augmented reality content that is then used to specify a size to filter search results. In another example, a geometric shape is used to represent a size and shape of an object included in a digital image (e.g., a two-dimensional digital image). The geometric shape is displayed as augmented reality digital content as part of a live stream of digital images to "assess fit" of the object in the user's physical environment. A variety of other examples are also contemplated as further described in the Detail Description.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Figure 1:
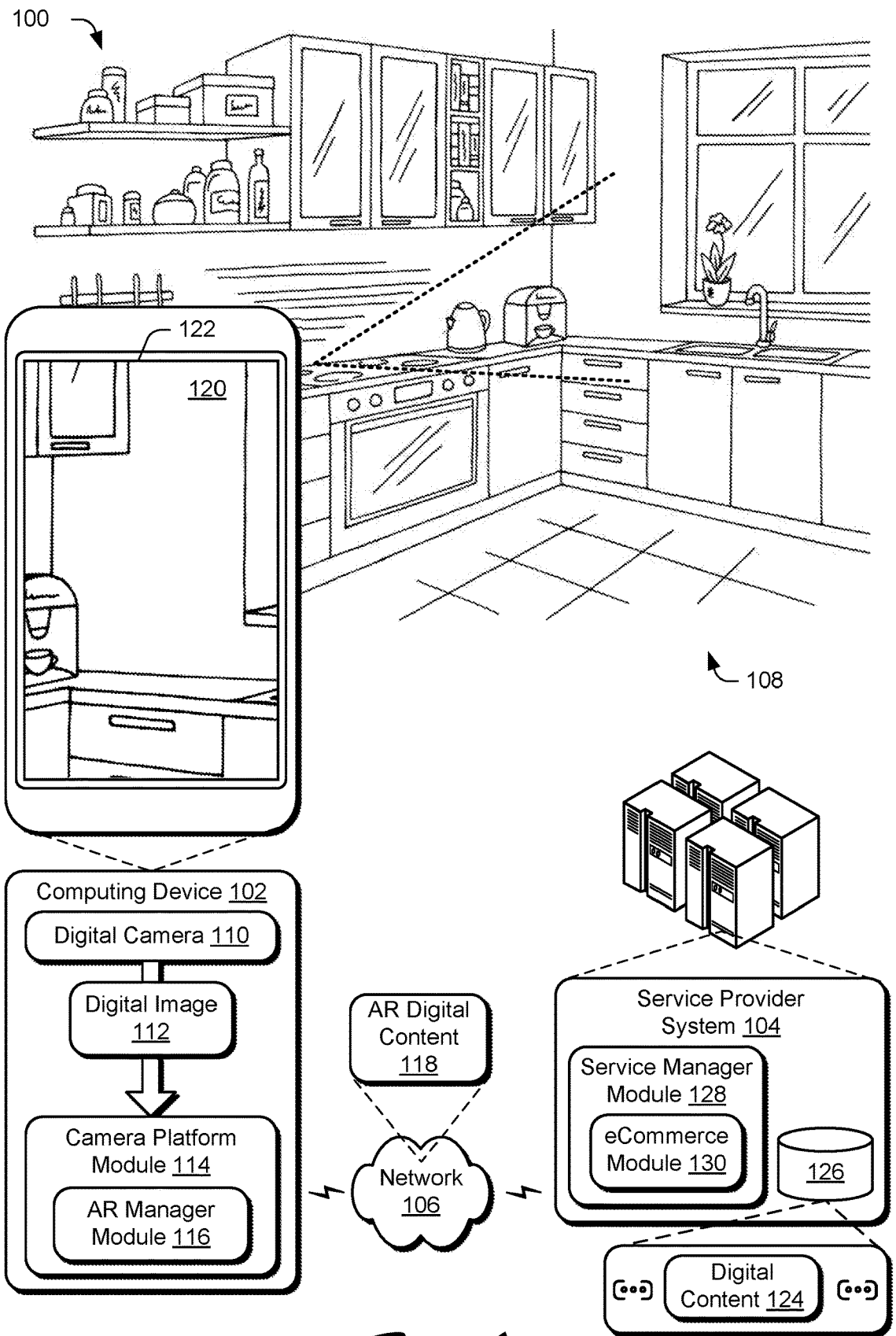
FIG. 1 is an illustration of an environment in an example implementation that is operable to employ augmented reality (AR) digital content search and sizing techniques described herein.

Conventional service providers systems provide users with access, via product listings as digital content, to thousands and even millions of different products having a wide range of sizes and shapes, even for particular types of products. Although product listings in the digital content may include rough dimensions about a size of a product, it may be difficult for a user to determine how that product will actually "fit in" for a desired use as described above. This is especially problematic for large and bulky items that may be difficult to return in instances in which a user's best guess is wrong in determining whether the product is a right fit due to limitations of conventional techniques and systems.

Accordingly, techniques and systems are described that leverage augmented reality digital content to help users gain additional insight into and navigate digital content describing thousands and even millions of products to locate a product of interest that fits a desired usage scenario. As a result, augmented reality digital content may increase efficiency of user interaction with the multitude of digital content that describes these products as well as increase operational efficiency of computing devices that manage this digital content. These techniques may be implemented in a variety of ways to leverage use of augmented reality digital content.

In one example, augmented reality (AR) digital content is leveraged to determine a desired size as part of a search query. The augmented reality digital content, for instance, may be used to determine a size of an available area, in which, a product is to be located. In another instance, the augmented reality digital content is used to specify a size of the product, itself. This size is used as part of a search query to filter the multitude of digital content to locate a product of interest that will "fit in" to the available area.

A user, for instance, may launch an application on a mobile phone that is associated with a service provider system. The service provider system includes digital content as listings of the thousands and millions of different products that may be available to the user, e.g., for purchase. In order to locate a particular product in this instance, the application receives a search input "kitchen appliance" from the user, e.g., via typed text, text converted from a user utterance using voice recognition, and so forth.

In response, the application also provides an option to select a geometric shape, e.g., cuboid, sphere, cylinder, and so forth. The geometric shape may be selected to approximate a shape of an area of the physical environment, in which, a product is to be placed. The geometric shape may also be selected to approximate a shape of a product that is to be placed in the physical environment.

The selected geometric shape is then output as augmented reality digital content by a display device of the computing device as part of a live stream of digital images captured by a digital camera of the computing device. The computing device, for instance, may implement a camera platform in which the live stream of digital images is captured of a physical environment, in which, the computing device is disposed. The selected geometric shape, as augmented reality digital content, thus "augments" this view of the physical environment provided by a user interface of the display device and thus appears as if the geometric shape is "really there."

The geometric shape, as augmented reality digital content, also supports manipulation with respect to the user's view of the physical environment as part of the live stream of digital images. User inputs, for instance, may be used to position the geometric shape at a particular location within the view of the physical environment, resize one or more dimensions of the geometric shape, orient the shape, and so forth. After this manipulation, a size of the geometric shape is determined, e.g., in response to a "determine size" option. The application, for instance, may determine dimensions of the physical environment and from this, determine dimensions of the geometric shape with respect to those dimensions. The dimensions may be determined in a variety of ways, such as from the live stream of digital images (e.g., parallax), dedicated sensors (e.g., radar signals using Wi-Fi technology), and so forth.

Continuing with the previous example, a user may select a rectangular geometric shape. The rectangular geometric shape is then positioned and sized by the user with respect to a view of a countertop, on which, the kitchen appliance that is a subject of a search input is to be placed. A size of the geometric shape (e.g., dimensions) is then used as part of a search query along with text of the search input "kitchen appliance" to locate kitchen appliances that fit those dimensions. Results of the search are then output by the computing device, e.g., as a ranked listing, as augmented reality digital content as replacing the geometric shape, and so forth. A user, for instance, may "swipe through" the search results viewed as augmented reality digital content as part of the live stream of digital images to navigate sequentially through the search results to locate a particular product of interest, which may then be purchased from the service provider system. In this way, the application and service provider system leverage augmented reality digital content to increase user efficiency in locating a desired product from the multitude of digital content with increased accuracy over conventional search techniques.

In another example, the augmented reality digital content is leveraged to determine a relationship of an object in a digital image with respect to a user's physical environment. The user, for instance, may navigate to digital content that includes a digital image of a particular object, e.g., a toaster oven available for sale. The digital content also includes an option to "assess fit" of the toaster oven in the user's physical environment. Once a user input is received that selects the option, for instance, a geometric shape is selected automatically and without user intervention by the application that approximates the outer dimensions of the object in the object in the digital image. This may be performed in a variety of ways, such as through object recognition techniques to process the digital image, dimensions of the object as part of the digital content (e.g., dimensions in the product listing), and so forth.

The geometric shape is then output as augmented reality digital content as part of the live stream of digital images of the user's physical environment. The computing device that executes the application, for instance, may determine dimensions of the physical environment, e.g., from the live stream of digital images using parallax, dedicated sensors (e.g., radar, depth), and so forth. These dimensions are then used to configure the digital content within the view of the physical environment as having the determined size. In this way, the geometric shape may be viewed as augmented reality digital content to approximate how the object (e.g., the toaster oven) will "fit in" within the physical environment.

The user, for instance, may position the geometric shape in relation to a view of a countertop as part of the live stream of digital images to gain an understanding as to how the toaster oven will fit with respect to the countertop. In this way, the application, computing device, and service provider system leverage augmented reality digital content to increase user efficiency in determining a described product will function as desired with increased accuracy over conventional techniques. Other examples are also contemplated, further discussion of which is included in the following sections and corresponding figures.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation that is operable to employ augmented reality (AR) digital content search and sizing techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in some instances, a computing device may be representative of a plurality of different devices, such as multiple servers utilized by a business to perform operations "over the cloud" for the service provider system 104 as described in FIG. 12.

The computing device 102 is illustrated as a mobile device (e.g., mobile phone, tablet) disposed in a physical environment 108, e.g., a kitchen. The computing device 102 includes a digital camera 110 that is configured to capture a live stream of digital images 112 of the physical environment 108 (e.g., the kitchen), such as through use of a charge coupled device (CCD) sensor. The captured digital images 112 may then be stored as pixels in a computer-readable storage medium and/or rendered for display by a display device, e.g., LCD, OLED, LED, and so forth.

The computing device 102 also includes a camera platform module 114 that is configured to implement and execute a camera platform (e.g., through use of a processing system and computer-readable storage media) that may serve as a basis for a variety of functionality. The camera platform, for instance, may implement a "live view" formed of digital images 112 taken of the physical environment of the computing device 102. These digital images 112 may then serve as a basis to support other functionality.

An example of this functionality is illustrated as an augmented reality (AR) manager module 116 that is configured to generate, manage, and support user interaction with augmented reality (AR) digital content 118. The AR digital content 118, for instance, may be included as part of the live stream of digital images 112 that are displayed in a user interface 120 by a display device 122 of the computing device 102. In this way, the AR digital content 118 augments a live view of the physical environment 108, e.g., as "if it was really there."

The AR digital content 118 and AR manager module 116 are leveraged by the computing device 102 and service provider system 104 to implement search and sizing techniques for digital content 124, which is illustrated as stored in a storage device 126 of the service provider system 104. The techniques described herein may also be leveraged locally by the computing device 102, further distributed across the digital medium environment 100, and so forth.

In one example, the AR digital content 118 is leveraged by the AR manager module 116 to supplement a search of digital content 124. The service provider system 104, for instance, includes a service manager module 128 that is configured to make services involving the digital content 124 available over the network 106, e.g., the computing device 102. An example of such a service is represented by an eCommerce module 130, which is representative of functionality to make products and/or services available for purchase that are represented by respective ones of the digital content 124. The digital content 124, for instance, may be configured as thousands and even millions of webpages, each listing a respective item for sale. Consequently, the digital content 124 may consume a significant amount of computational resources to store, navigate, and output.

In order to supplement the search of the digital content 124, the AR digital content 118 is configured in this example to specify a geometric shape of a location in a physical environment 108, at which, a product is to be placed. In the illustrated example, for instance, a geometric shape may be selected and placed on an open space on a kitchen countertop through user interaction with the user interface 120. A size of the shape is then used to supplement a search of the digital content 124, e.g., to locate kitchen appliances that would "fit in" to the space specified by the shape. In this way, a user may quickly navigate through the millions of items of digital content 124 to locate a desired product in an efficient and accurate manner, further discussion of which is described in a corresponding section and shown in relation to FIGS. 2-7.

In another example, the AR digital content 118 is used to determine whether an object that has already been located "fits" at a desired location. A user of the computing device 102, for instance, may locate an item of digital content 124 that describes an object of interest, e.g., for purchase. The digital content 124 includes an option in this example to "assess fit" of the object. A two-dimensional image from the digital content 124, for instance, may be examined (e.g., by the service provider system 104 and/or computing device 102) to locate an object of interest. Dimensions of the object are then used (e.g., via object recognition) to select from a plurality of pre-defined geometric shapes to select a geometric shape that approximates an outer boundary of the object. A size of the object is also determined, e.g., from the digital image itself, from dimensions in a product listing included in the digital content 124, and so forth.

The geometric shape is then displayed as AR digital content 118 as part of the live stream of digital images 112. The computing device 102, for instance, may determine dimensions of a physical environment viewed in the live stream of digital images 112 in the user interface 120, e.g., through parallax exhibited by the digital images 112, dedicated sensors, and so forth. The geometric shape, as part of the AR digital content 118, is then sized based on the determined dimensions of the object and the dimensions of the physical environment. In this way, the AR digital content 118 accurately represents a size and shape of the object in the digital image. A user may then interact with the user interface to place the geometric shape at a desired location in a view of the physical environment via a live stream of digital images, e.g., on the illustrated countertop to see if the object "fits" as desired. In this way, a user may quickly and efficiently determine if a product in a digital image in the digital content (e.g., a product listing) will function as desired, further discussion of which is described in a corresponding section and shown in relation to FIGS. 8-11.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Augmented Reality Digital Content Search Techniques

Figure 2:
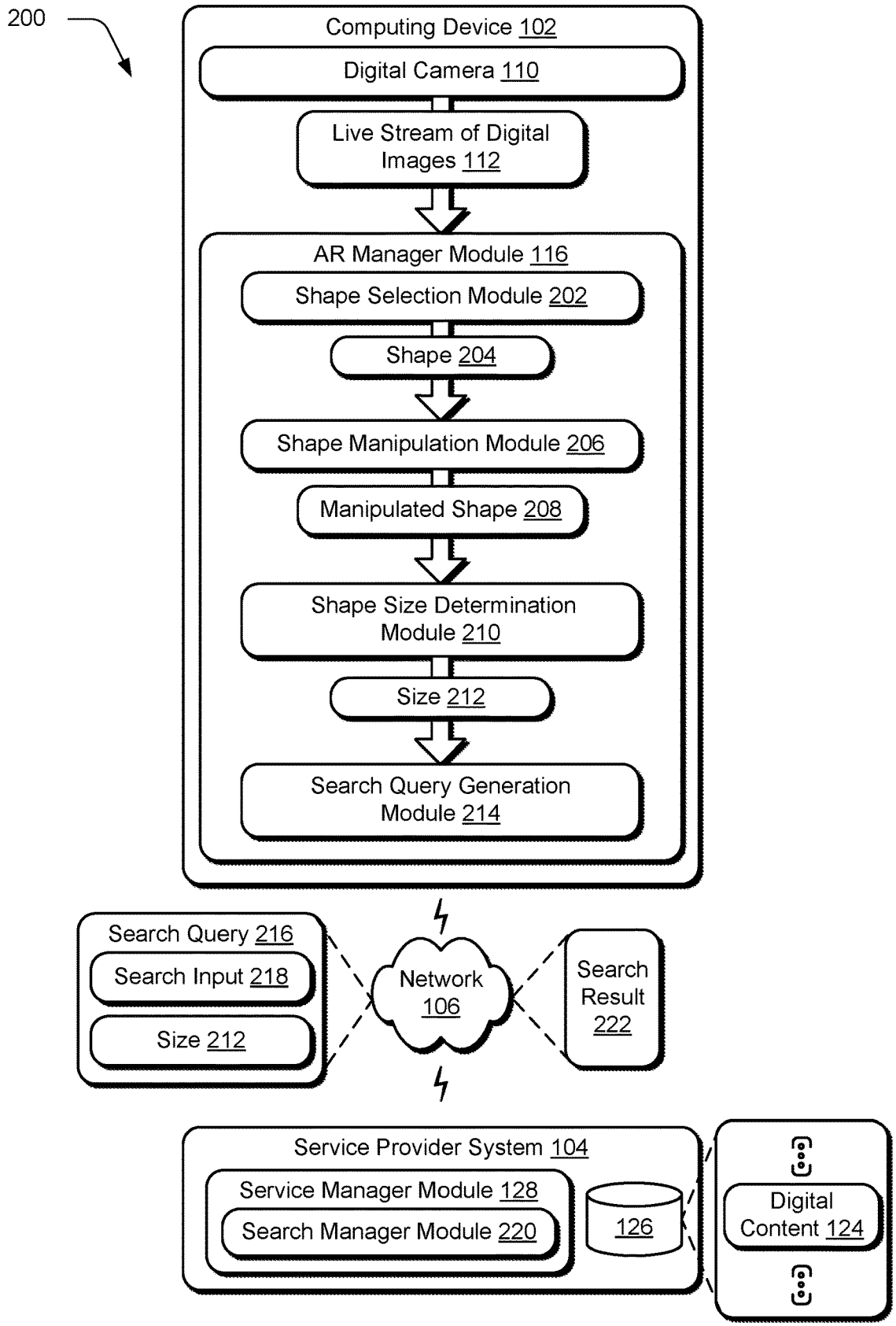
FIG. 2 depicts a system showing operation of an AR manager module of FIG. 1 as generating a search query that includes a size based on a geometric shape displayed as augmented reality digital content.
Figure 3:
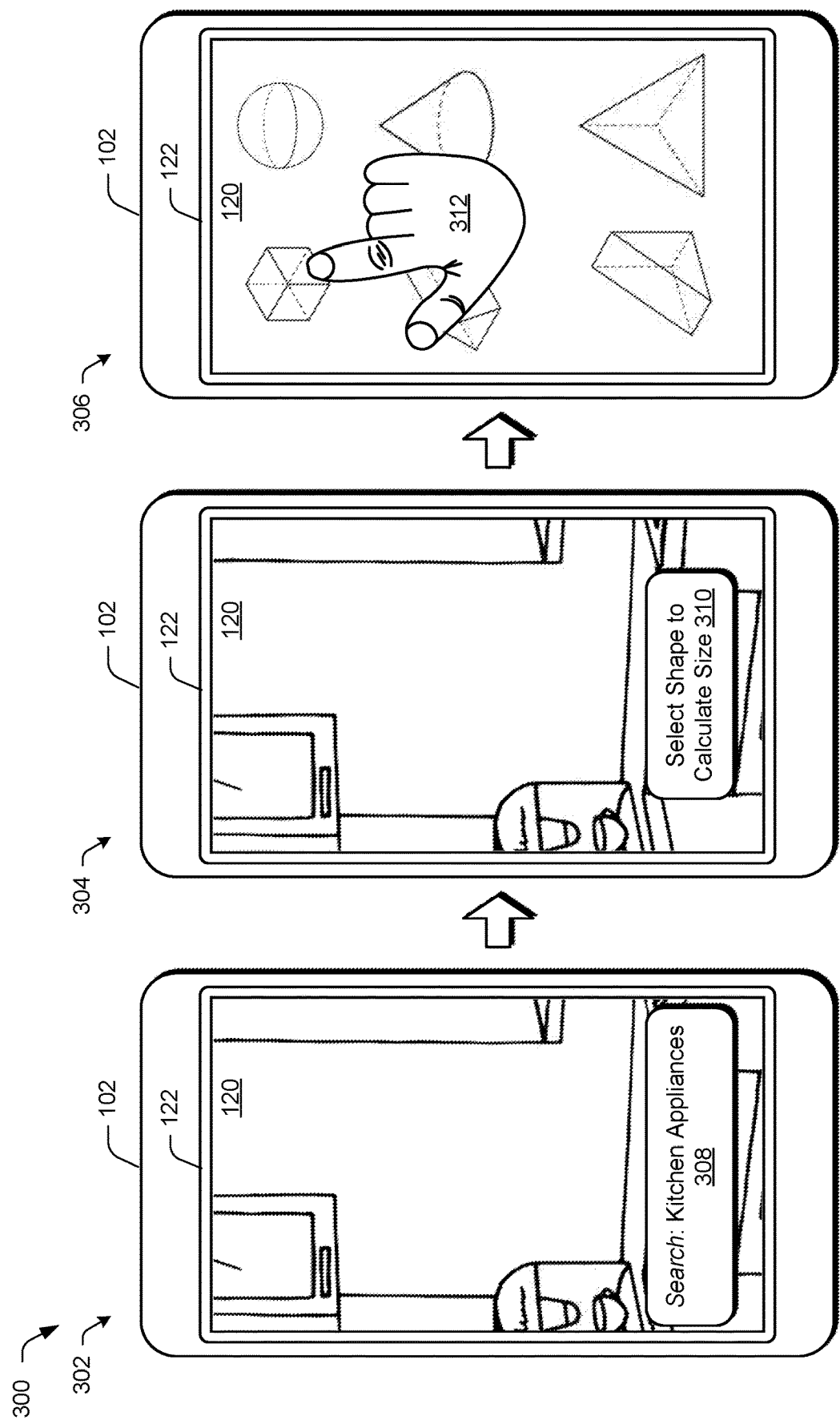
FIG. 3 depicts an example implementation of selecting a geometric shape for augmented reality digital content.
Figure 4:
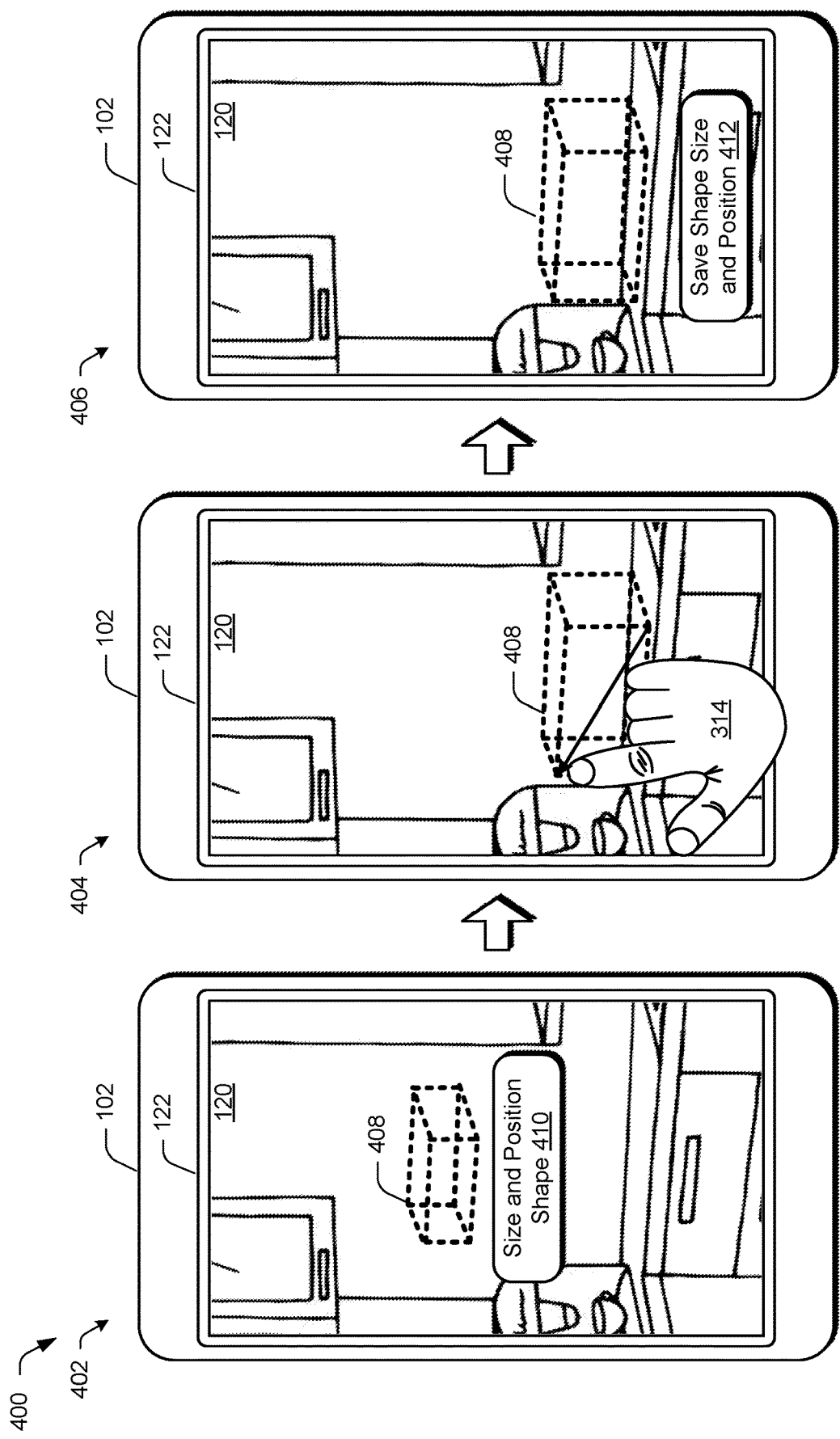
FIG. 4 depicts another example implementation of geometric shape selection.
Figure 5:
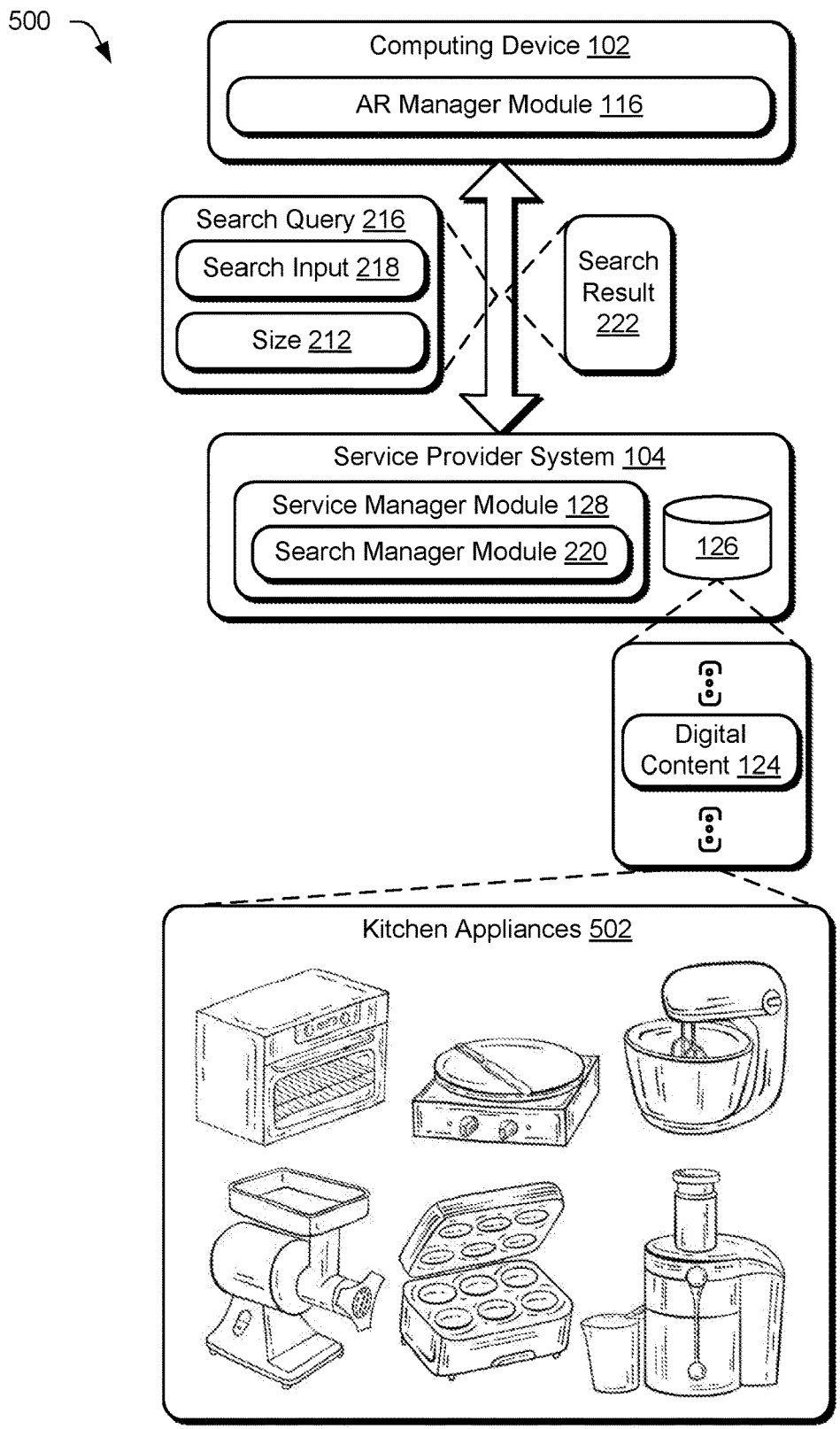
FIG. 5 depicts a system in an example implementation of performing a search using the search query generated by a system of FIG. 2.
Figure 6:
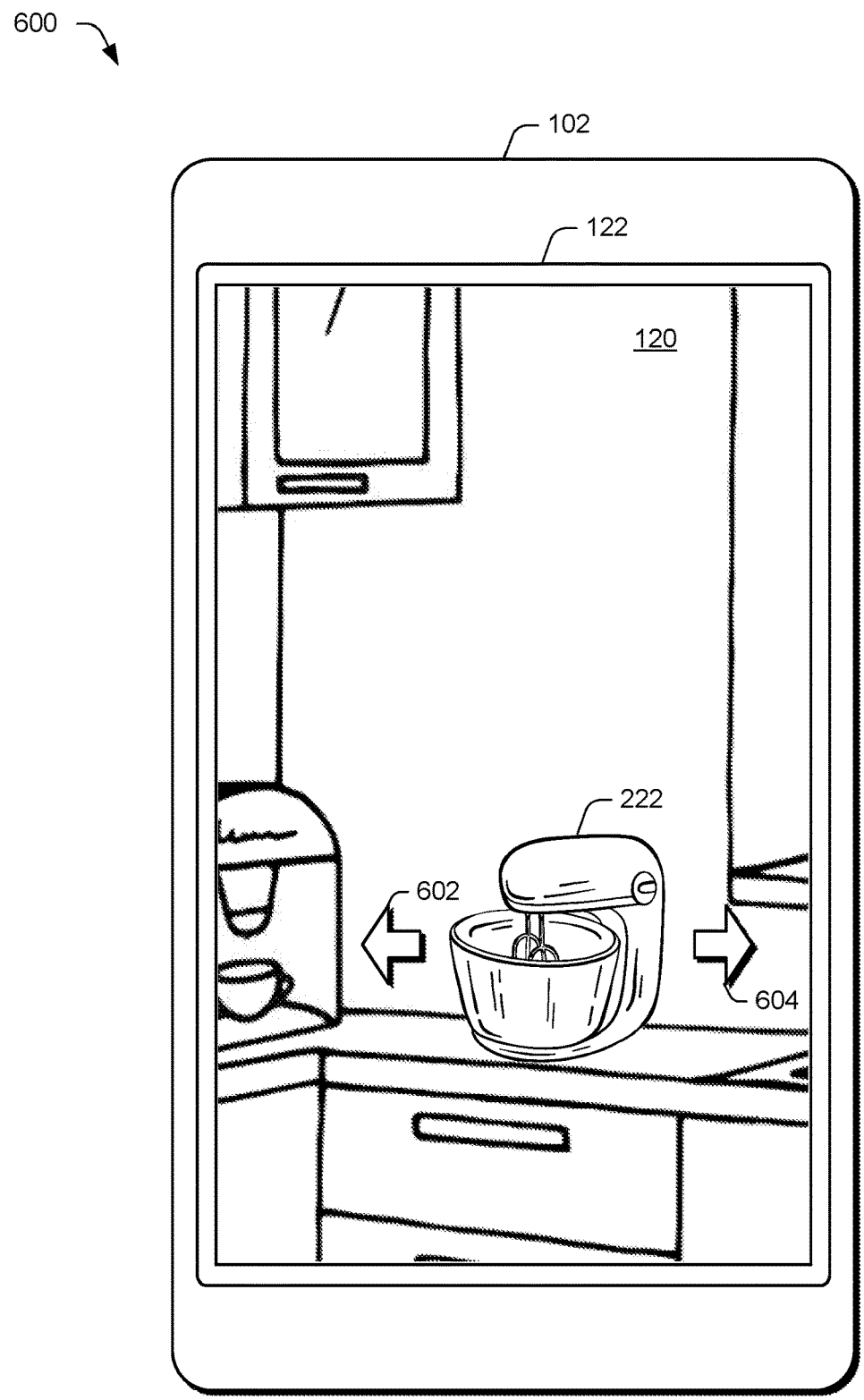
FIG. 6 depicts an example implementation of output of a search result of the search performed in FIG. 5 as augmented reality digital content as part of a live feed of digital images.
Figure 7:
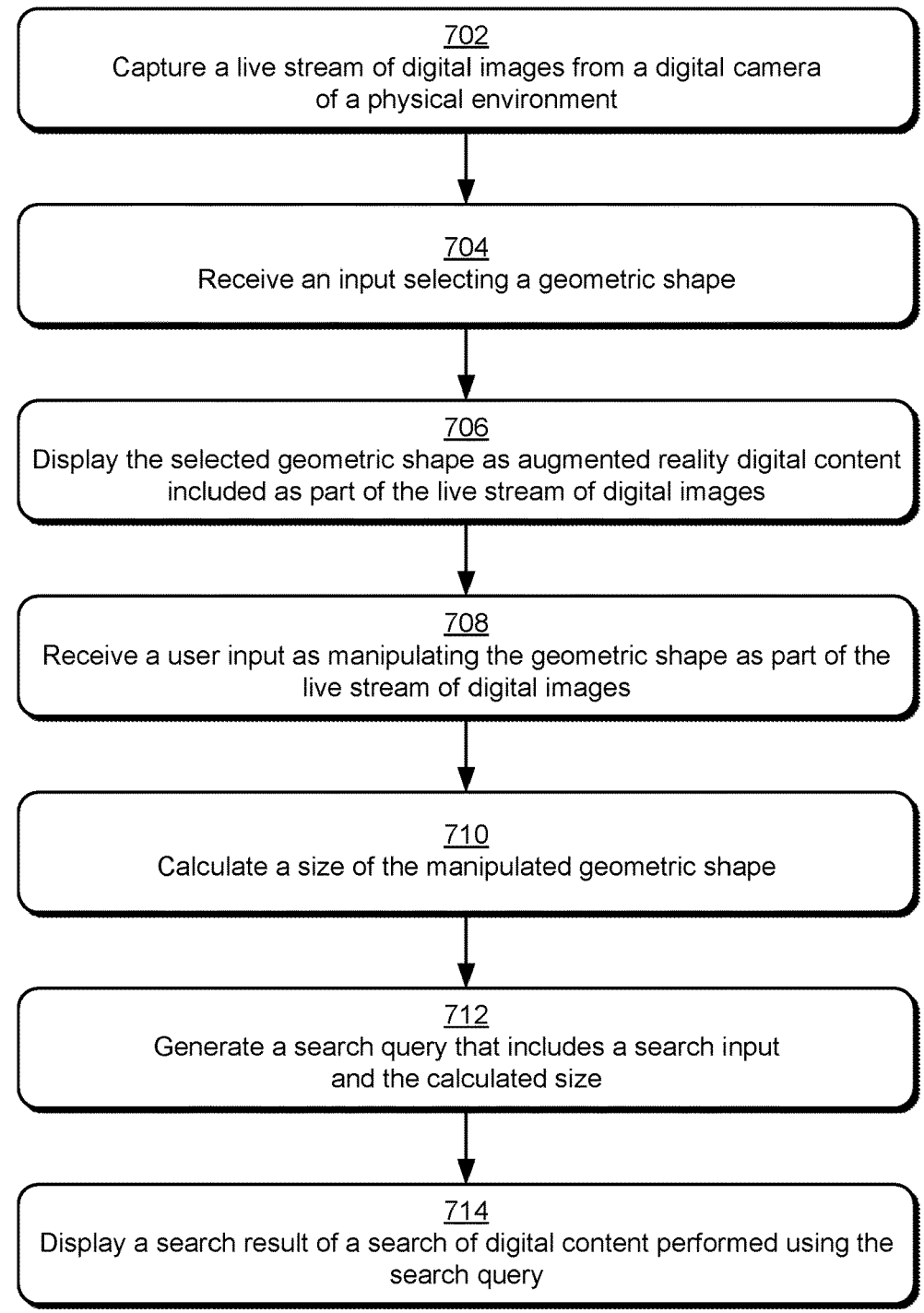
FIG. 7 depicts a procedure in an example implementation in which a geometric shape is manipulated as augmented reality digital content with respect to a live feed of digital image to determine a size used to generate a search query and perform a search based on the query.

FIG. 2 depicts a system 200 showing operation of the AR manager module 116 of FIG. 1 as generating a search query that includes a size based on a geometric shape displayed as augmented reality digital content. FIG. 3 depicts an example implementation 300 of selecting a geometric shape for use as AR digital content. FIG. 4 depicts another example implementation 400 of geometric shape selection. FIG. 5 depicts a system 500 in an example implementation of performing a search using the search query generated by the system 200 of FIG. 2. FIG. 6 depicts an example implementation 600 of output of a search result of the search performed in FIG. 5 as augmented reality digital content as part of a live feed of digital images. FIG. 7 depicts a procedure 700 in an example implementation in which a geometric shape is manipulated as augmented reality digital content with respect to a live feed of digital images to determine a size used to generate a search query and perform a search based on the query.

The following discussion describes techniques that may be implemented utilizing the previously described systems and devices. Aspects of the procedure as shown stepwise by the modules of FIG. 2 may be implemented in hardware, firmware, software, or a combination thereof. The procedure of FIG. 7 is shown as a set of blocks that specify operations performed by one or more devices and are not necessarily limited to the orders shown for performing the operations by the respective blocks. In portions of the following discussion, reference will be made to FIGS. 2-7.

To begin in this example, a computing device 102 of a user captures a live stream of digital images 112 of a physical environment 108, in which, the computing device is disposed through use of a digital camera 110 (block 702). FIG. 3, for instance, depicts an example 300 of user interaction with the computing device 102 through use of first, second, and third stages 302, 304, 306. At the first stage 302, the live stream of digital images 112 is output in a user interface 120 by a display device 122 of the computing device 102. An application is also executed by the computing device 102 that leverages functionality of the AR manager module 116 to generate a search query to perform a search, e.g., by a service provider system 104.

The AR manager module 116, for instance, may output an option 308 in the user interface 120 to receive a search input. The search input may be provided in a variety of ways, such as input directly via text, converted using speech-to-text recognition based on a spoken utterance, and so forth. In the illustrated example of the first stage 302, the text "kitchen appliances" is received as a user input.

A shape selection module 202 is then employed by the AR manager module 116 to receive a user input to select a geometric shape 204 (block 704). Continuing with the example 300 of FIG. 3, an option is output in the user interface by the shape selection module 202 to "select shape to calculate size" 310 in response to receipt of the search input. Selection of this option at the second stage 304 causes output of a plurality of predefined geometric shapes (e.g., two or three dimensions) in the user interface 120 at the third stage 306. From these options, a user input is received to select a particular shape, e.g., via touchscreen functionality by a user's hand 312, a cursor control device, spoken utterance, and so on. In a two dimensional example, the shape may specify an area on a surface, e.g., a countertop. In a three dimensional example, the shape may specify a volume, e.g., the area on the surface as well as a height.

FIG. 4 continues the example 300 of FIG. 3 also through use of first, second, and third stages 402, 404, 406. At the first stage 402, the selected geometric shape 408 is displayed by a display device 122 of the computing device 102 as augmented reality digital content included as part of the live stream of digital images 112 (block 706). As a result, the geometric shape augments the user's view of the live stream of digital images 112 captured of the physical environment 108 to appear "as if it is really there."

A user input is also received via the display device 122 as manipulating the geometric shape as part of the live stream of digital images (block 708). The selected shape 204, for instance, may be communicated by the shape selection module 202 to a shape manipulation module 206. The shape manipulation module 206 is representative of functionality of the AR manager module 116 that accepts user inputs to modify a location and/or size of the geometric shape 308, e.g., height, width, depth or other dimensions of the selected geometric shape 408.

In one example, the geometric shape 408 is output at the first stage 402 of FIG. 4 along with instructions to "size and positions shape" 410. A user input is received at the second stage 404 to change one or more dimensions of the shape 408 as well as position of the shape within a view of the live stream of digital images 112 in the user interface 120 as captured from the physical environment 108. The user inputs, for instance, may select edges or points along a border of the shape to resize dimensions of the shape via touchscreen functionality of the display device 122. The user inputs may also select internal portions of the shape to position the shape 408 within a desired location of the user interface 120, e.g., to "drag" the geometric shape 408 to a desired location such as to appear positioned on a countertop as illustrated.

At the third stage 406, an option is output to "save shape size and position" 412 in the user interface 120. In this way, shape selection may be used to define a corresponding position and size within the user interface 120. Other examples of shape selection and manipulation are also contemplated, including receipt of a user input via the user interface 120 to draw the shape as one or more freeform lines through interaction with the user interface 120. A user, for instance, may specify a first point in a user interface and perform a "click-and-drag" operation to specify a shape and manipulate the shape.

Returning again to FIG. 2, the manipulated shape 208 is then passed from the shape manipulation module 206 to a shape size determination module 210, e.g., in response to the "save shape size and position" option 412. The shape size determination module 210 is then implemented to calculate a size 212 of the manipulated geometric shape (block 710), e.g., in two or three dimensions.

The shape size determination module 210, for instance, may first determine dimensions of the physical environment 108. This may be determined in a variety of ways. In one example, the dimensions of the physical environment 108 are determined from the live stream of digital images 112 based on parallax, e.g., in the object that are closer to the digital camera 110 exhibit greater amounts of movement that objects that are further away from the digital camera 110, e.g., in successive and/or stereoscopic images. In another example, dedicated sensors of the computing device 102 are used, such as time-of-flight cameras, structure light grid arrays, depth sensors, and so forth.

Once the dimensions of the physical environment are determined, dimensions of the manipulated shape 208 are then determined with respect to those dimensions. Returning again to FIG. 4, for instance, dimensions of the countertop may be determined, and from this, dimensions of the manipulated shape 208 as positioned on the countertop based on those dimensions. In this way, the size 212 calculated by the shape size determination module 210 specifies a relationship of the manipulated shape 208 to a view of the physical environment 108 via the live stream of digital images 112 as augmented reality digital content.

The size 212 is then communicated from the shape size determination module 210 to a search query generation module 214 to generate a search query 216 that includes a search input 218 and the size 212 (block 712). The search input 218, for instance, may include the text used to initiate the sizing technique above, e.g., "kitchen appliances." The search input 218, along with the size 212, form a search query 216 that is used as a basis to perform a search.

The search query 216, for instance, may be communicated via the network 106 to a service provider system 104 as illustrated in FIG. 5. The service provider system 104 includes a search manager module 220 that search digital content 124 that relates to kitchen appliances 502 as specified by the search input 218 and that has a size that approximates and/or is less than the size 212 specified by the search query 216, e.g., within a threshold amount such as a defined percentage. This is used to generate a search result 222 that is then communicated back to the computing device 102. Although network communication is described in this example, this search may also be performed locally for digital content also stored locally at the computing device 102 or a combination thereof.

The search result 222 is then displayed that is generated based on the search of digital content 124 performed using the search query 216 (block 714). This may be performed in a variety of ways. In a first example, the search result 222 includes a ranked listing of items of digital content 124, e.g., as a listing of different appliances based on "how well" these items satisfy the search input 218 and/or the size 212 of the search query 216.

In another example 600 as illustrated in FIG. 6, the search result 222 is displayed as augmented reality digital content with the user interface 120 as part of the live stream of digital images 112. The AR manager module 116, for instance, may determine placement of the search result 222 within the user interface 120 based on the location of the geometric shape 204. In this way, the user is provided with a view of the search result, and more particularly items that are a subject of the search result 222, "in place" as augmenting the user's view of the physical environment 108. Options may also be provided to navigate through the search results (e.g., the ranked list) to view these items "in place," e.g., by swiping through the list, through use of backward 602 and forward 604 arrows that are user selectable, and so forth. In this way, the geometric shape may be viewed as augmented reality digital content to both form a search query and to approximate how items in a search result will "fit in" within the physical environment 108. A variety of other examples are also contemplated, discussion of another such example is included in the following section and shown using corresponding figures.

Augmented Reality Digital Content Sizing Techniques

Figure 8:
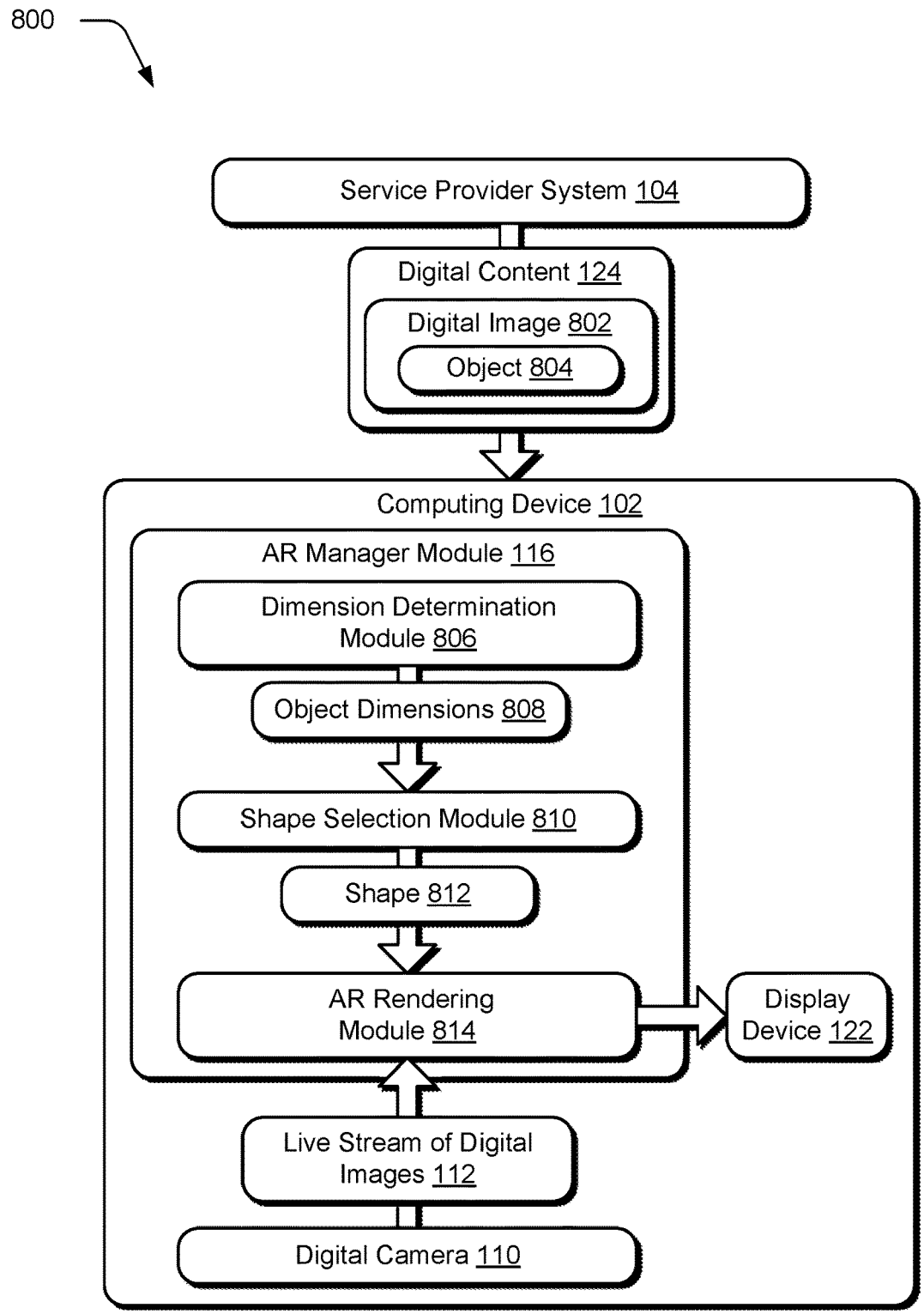
FIG. 8 depicts a system showing operation of an AR manager module of FIG. 1 as supporting assess fit functionality through use of augmented reality digital content.
Figure 9:
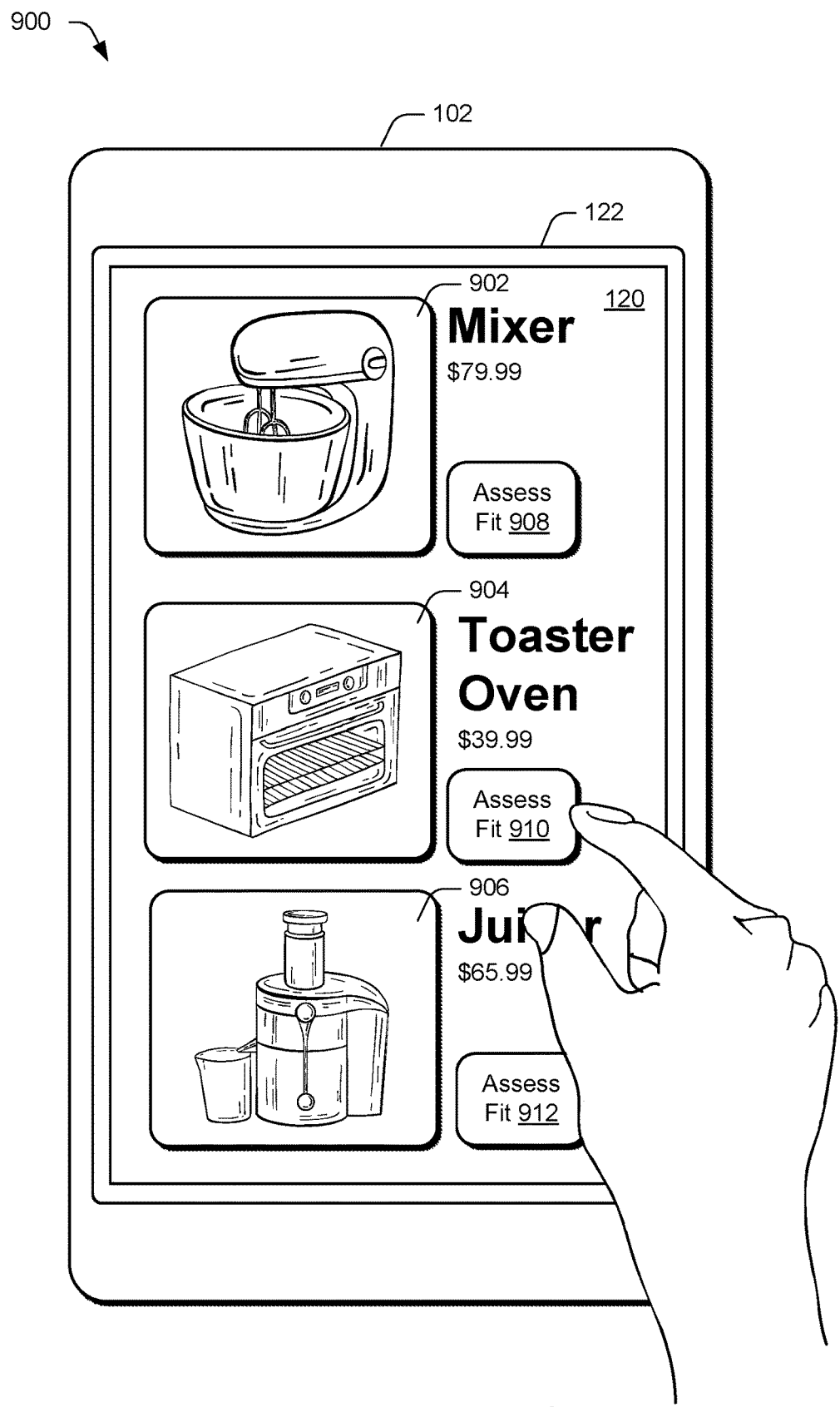
FIG. 9 depicts an example implementation of selecting an item of digital content having an object, for which, fit is to be assessed within a physical environment.
Figure 10:
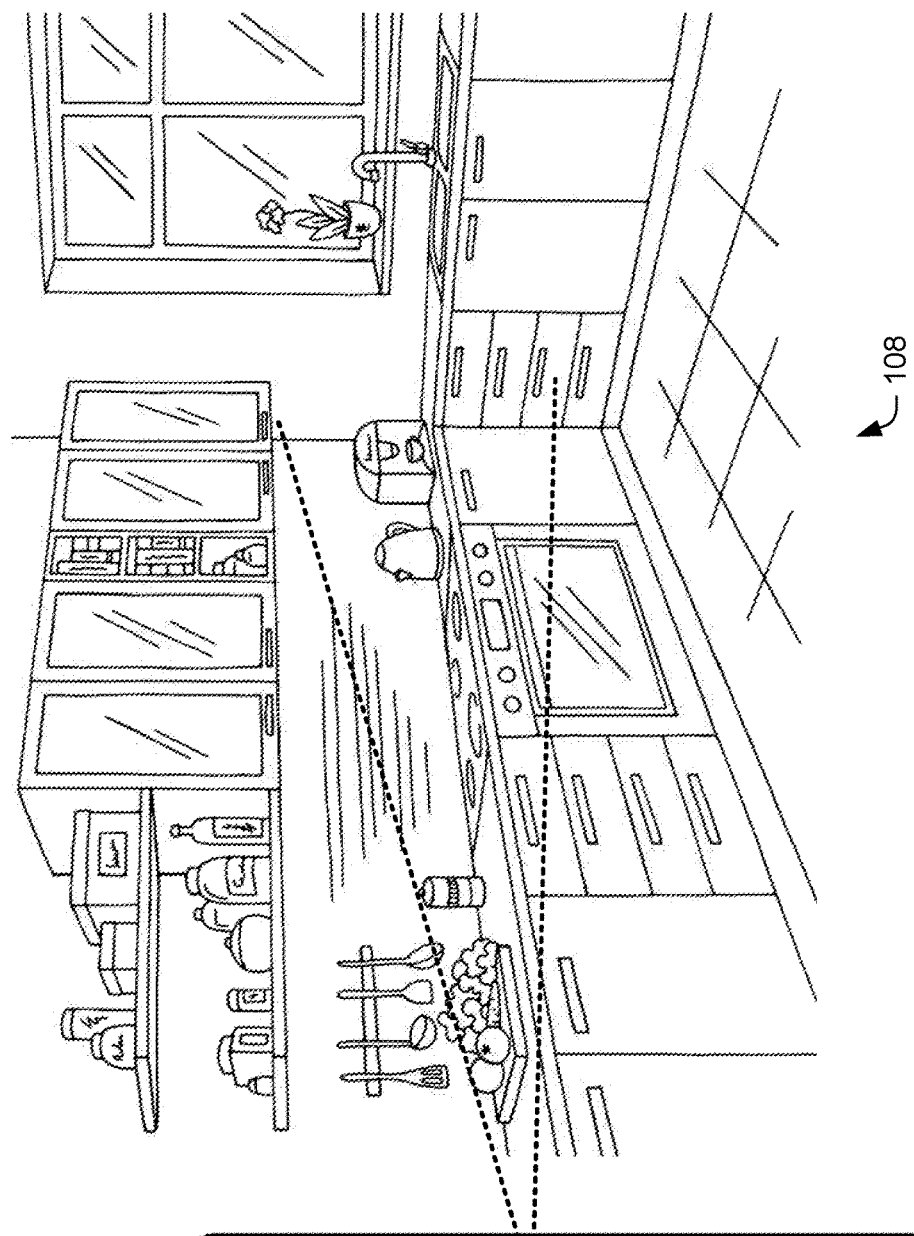
FIG. 10 depicts an example implementation showing use of a geometric shape displayed as augmented reality digital content to assess fit of an object from the digital content of FIG. 9.
Figure 11:
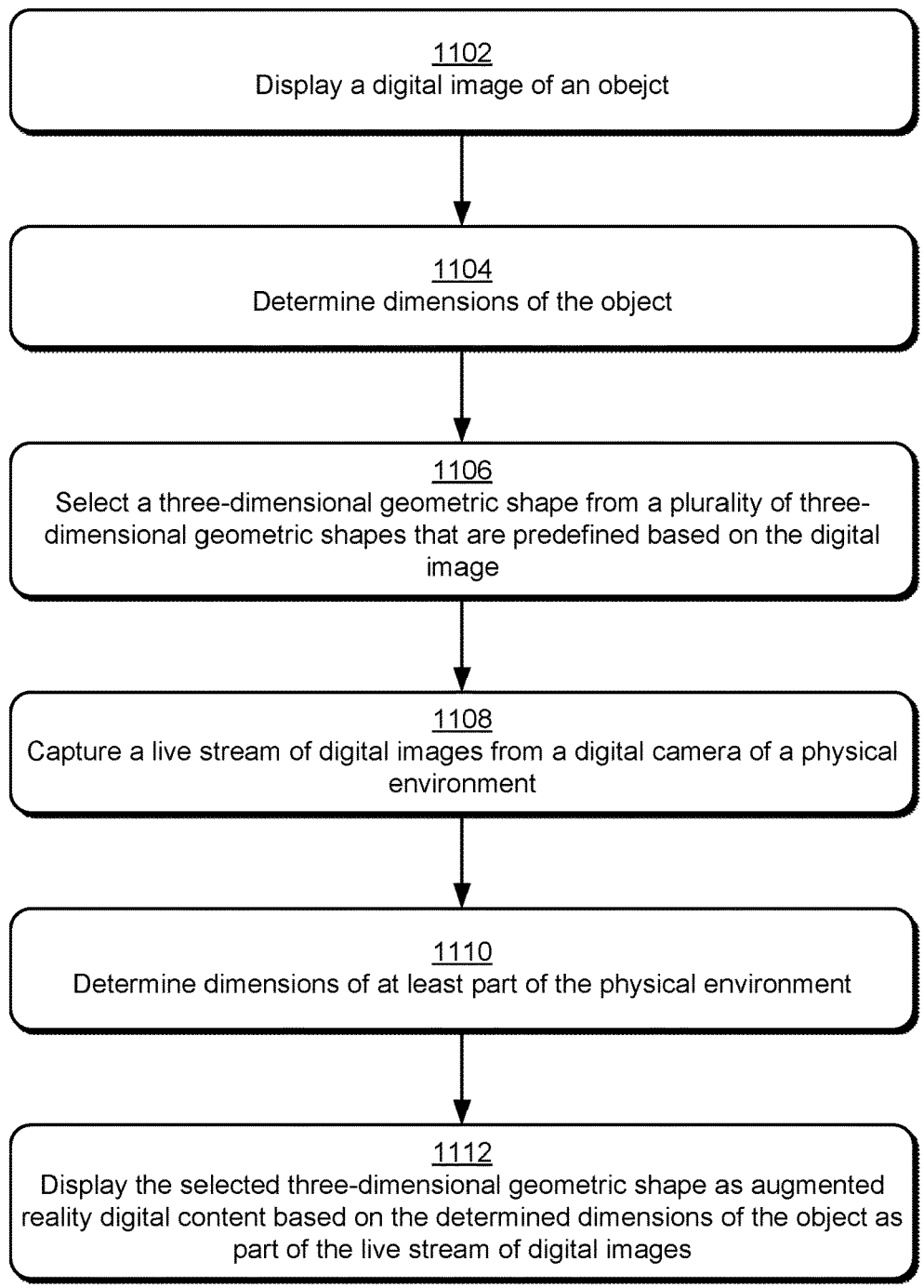
FIG. 11 depicts a procedure in an example implementation in which a geometric shape used as augmented reality digital content as part of a live stream of digital images to assess fit of an object from the digital content.

FIG. 8 depicts a system 800 showing operation of the AR manager module 116 of FIG. 1 as support "assess fit" functionality through use of augmented reality digital content. FIG. 9 depicts an example implementation 900 of selecting an item of digital content, for which, fit is to be assessed within a physical environment through use of augmented reality digital content. FIG. 10 depicts an example implementation 1000 showing use of a geometric shape displayed as augmented reality digital content to assess fit of an object from the digital content of FIG. 9. FIG. 11 depicts a procedure 1100 in an example implementation in which a geometric shape is used as augmented reality digital content as part of a live stream of digital images to assess fit of an object from the digital content.

The following discussion describes techniques that may be implemented utilizing the previously described systems and devices. Aspects of the procedure as shown stepwise by the modules of FIG. 8 may be implemented in hardware, firmware, software, or a combination thereof. The procedure of FIG. 11 is shown as a set of blocks that specify operations performed by one or more devices and are not necessarily limited to the orders shown for performing the operations by the respective blocks. In portions of the following discussion, reference will be made to FIGS. 8-11.

In the previous example, the AR manager module 116 leverages augmented reality digital content to perform a search of digital content 124 for items of interest, e.g., that may fit into a desired area as specified by the digital content 124. In this example, the AR manager module 116 is leveraged to assess fit of digital content that has been located for use in a desired location through use of AR digital content.

To begin in this example, a digital image of an object is displayed in a user interface 120 of a computing device 102 (block 1102). A user, for instance, may interact with the computing device 102 and locate digital content 124, e.g., a product listing of a particular object for sale. A digital image 802 is included of an object 804 as part of the digital content 124, e.g., which depicts the particular object for sale. Other examples are also contemplated, e.g., an object included in a digital image of an article, blog, and other examples that do not involve ecommerce.

As shown in FIG. 9, for instance, the user interface 120 includes first, second, and third product listings 902, 904, 906. These listings includes respective options that are user selectable to "assess fit" 908, 910, 912 of a respective item. In this way, user interaction with the digital content may be expanded through use of augmented reality digital content into a view of the "real world."

To do so, dimensions 808 of the object are determined (block 1104) by a dimension determination module 806 of the AR manager module 116. This may be performed in a variety of ways. In one example, the dimensions are determined based on object recognition. An object, for instance, may be recognized from the digital image 802 (e.g., as a two-dimensional digital image) using machine learning techniques. Recognition of the object is then used as a basis to perform a search to obtain the object dimensions 808, e.g., as an internet search, from a database of object dimensions, and so forth. In another example, the object dimensions 808 are determined, at least in part, from the digital content 124, itself. The digital content 124, for instance, may include a product listing that includes the object dimensions 808. This may be used to supplement the object recognition example above and/or serve as a sole basis for the determination of the object dimensions 808 by the dimension determination module 806.

A shape 812 (e.g., a three-dimensional geometric shape) is then selected by a shape selection module 810 from a plurality of three-dimensional geometric shapes that are predefined (block 1106). The shape selection module 810, for instance, may select from a plurality of predefined shapes to locate a shape that best approximates an outer border of the object 804 in the digital image 802. This may be performed in a variety of ways. In one example, this selection is based on the determined dimensions 808, which may be taken from orthogonal (e.g., up/down, back/front, left/right) directions to each other, non-orthogonal directions (diagonals), and so forth. In another example, this selection is performed using object recognition, e.g., to recognize the object 804 is generally cuboid, spherical, and so forth. An object, or collection or objects, may then be selected to approximate an outer boundary of the object 804, e.g., to select a cone and a cylinder to approximate a table lamp. A variety of other examples are also contemplated.

An AR rendering module 814 is then employed by the AR manager module 116 to render the shape based on the object dimensions 808 as augmented reality digital content for display by the display device 122. A digital camera 110, for instance, may be utilized to capture a live stream of digital images 112 of a physical environment 108, in which, the computing device 102 is disposed, e.g., the kitchen of FIG. 1 (block 1108).

Dimensions are also determined of the physical environment 108 (block 1110) by the AR rendering module 814. As previously described, this may be performed in a variety of ways, including based on the live stream of digital images 112 themselves (e.g., parallax), use of dedicated sensors (e.g., radar sensors, depth sensors), and so forth.

The selected three-dimensional geometric shape 812 is then rendered by the AR rendering module 814 and displayed as augmented reality digital content by the display device 122 based on the determined dimensions of the object as part of the live stream of digital images 112 (block 1112). The AR rendering module 814, for instance, includes data describing dimensions of the physical environment. Based on these dimensions, the AR rendering module 814 determines a size, at which, to render the shape 812 in the user interface 120 such that the size of the shape 812 corresponds with the dimensions of the physical environment 108. As a result, the shape 812 "appears as it is actually there" as viewed as part of the live stream of digital images 112.

As described above, in one example the shape 812 is chosen to approximate the outer dimensions of the object 804, and as such may be considered to roughly model the overall dimensions of the object 804 and thus avoids resource consumption involved in detailed modeling of the object 804. As a result, the shape 812 may be used to represent rough dimensions of the object 804 in the user interface in real time as the digital image 802 is received through increased computational efficiency. An example of this representation of the object 804 by the shape 812 is depicted in FIG. 10 in which a three-dimensional geometric shape 1002 is used to approximate an outer boundary the toaster oven of FIG. 9 but does not involve detailed modeling of the object 804. Other examples are also contemplated in which detailed modeling using a plurality of shapes 812 to represent corresponding portions of the object 804 are used.

The user interface 120, as described above, also supports techniques to reposition the three-dimensional geometric shape 1002 within the view of the physical environment, such as to place the object at different locations on the kitchen countertop, and so forth. In response, the AR rendering module 814 also adjusts a size of the shape to correspond with dimensions of the physical environment at that location, e.g., to appear smaller as moved "away" and larger as moved closer in the user interface. In this way, user interaction with the digital content 124 may be expanded through use of AR digital content 118 to expand a user's insight and knowledge regarding objects 804 included in digital images 802.

Example System and Device

Figure 12:
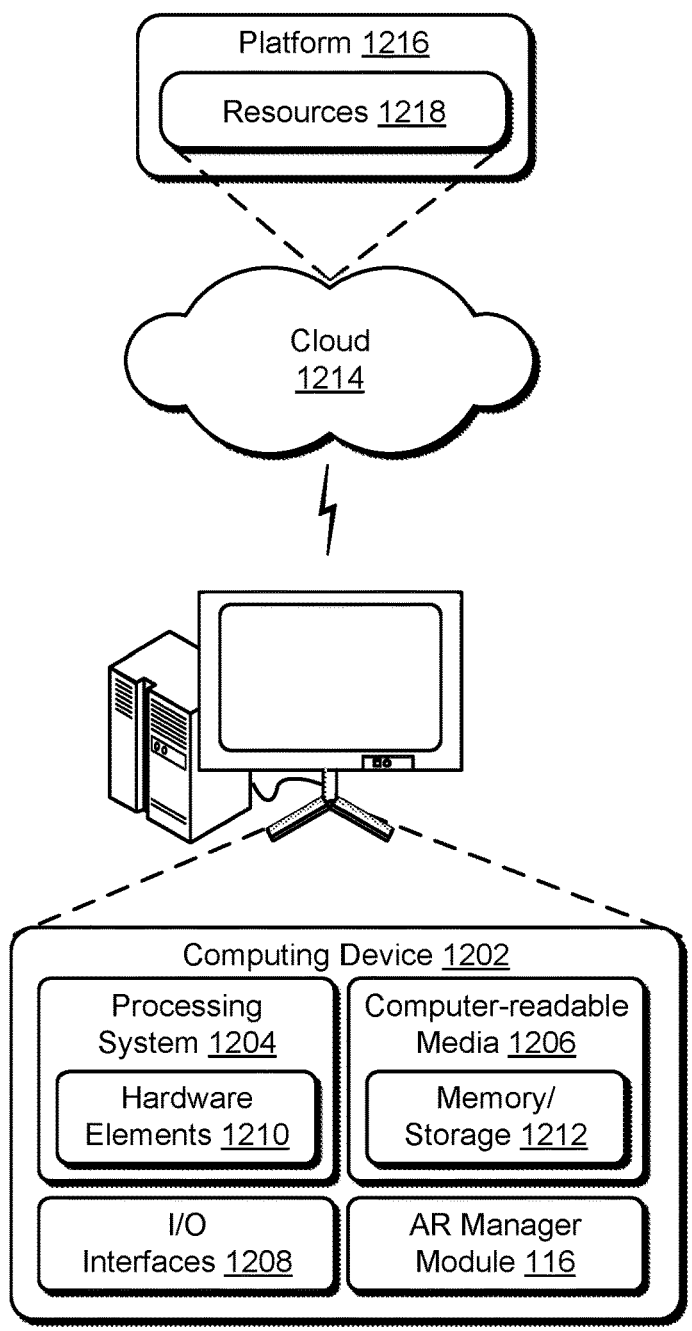
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the AR manager module 116. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   displaying a user interface that includes a digital image and an option associated with an object included in the digital image, the option selectable to assess a fit of the object in a physical environment;
   receiving, via the user interface, an input selecting the option associated with the object;
   determining dimensions of the object included in the digital image;
   automatically selecting, based on the dimensions of the object included in the digital image, a geometric shape that approximates an entire outer border of the object included in the digital image; and
   displaying a representation of the selected geometric shape without the object to approximate the entire outer border of the object as augmented reality digital content as part of a live stream of the physical environment.

2. The method as described in claim 1, further comprising displaying in the user interface an additional digital image and an additional option associated with an additional object included in the additional digital image, the additional option selectable to assess a fit of the additional object in the physical environment.

3. The method as described in claim 1, further comprising determining dimensions of at least a portion of the physical environment, wherein the displaying the representation of the selected geometric shape to approximate the entire outer border of the object as augmented reality digital content is based at least in part on the determined dimensions of the physical environment.

4. The method as described in claim 1, wherein the displaying the representation of the selected geometric shape to approximate the entire outer border of the object as augmented reality digital content further comprises:
   determining dimensions of at least a portion of the physical environment;
   determining a size at which to display the geometric shape based on determined dimensions of the object and the dimensions of the physical environment; and
   displaying the representation of the selected geometric shape without the object as augmented reality digital content as part of the live stream of the physical environment such that the size of the geometric shape corresponds to the dimensions of the physical environment.

5. The method as described in claim 1, wherein the selecting the geometric shape that approximates the entire outer border of the object is performed using object recognition.

6. The method as described in claim 1, wherein the geometric shape comprises a three-dimensional shape, and wherein the selecting the geometric shape comprises selecting the geometric shape from a plurality of three-dimensional geometric shapes.

7. The method as described in claim 6, wherein the digital image comprises a two-dimensional digital image.

8. The method as described in claim 1, wherein the live stream of the physical environment is captured using a camera of the computing device.

9. The method as described in claim 1, wherein the digital image is associated with a product listing that lists the object for sale on an online platform.

10. The method as described in claim 1, further comprising:
    receiving an additional input to manipulate the geometric shape;
    adjusting a size or a positioning of the geometric shape in the physical environment based on the additional input; and
    displaying a representation of the adjusted geometric shape as augmented reality digital content as part of the live stream of the physical environment.

11. The method as described in claim 1, wherein the geometric shape comprises a two-dimensional geometric shape, and wherein the selecting the geometric shape comprises selecting the geometric shape from a plurality of two-dimensional geometric shapes.

12. The method as described in claim 1, wherein the geometric shape comprises at least one of a rectangle, a cuboid, a sphere, a cylinder, or a cone.

13. The method as described in claim 1, further comprising selecting a geometric shape that approximates an area of the physical environment in which to place the object.

14. The method as described in claim 1, wherein the displaying the selected geometric shape comprises displaying the selected geometric shape to approximate the entire outer border of the object as augmented reality digital content as part of a live stream of the physical environment such that the geometric shape is displayed without displaying a digital representation of the object.

15. The method as described in claim 1, wherein the object dimensions are determined based at least in part on digital content associated with the digital image.

16. The method as described in claim 15, wherein the digital content includes a product listing that includes the dimensions of the object.

17. A computing device comprising:
a display device;
a camera to capture a live stream of a physical environment; and
at least a memory and a processor to perform operations comprising:
  displaying, via the display device, a user interface that includes a digital image and an option associated with an object included in the digital image, the option selectable to assess a fit of the object in the physical environment;
  receiving an input selecting the option associated with the object;
  determining dimensions of the object included in the digital image;
  automatically selecting, based on the dimensions of the object included in the digital image, a geometric shape that approximates an entire outer border of the object included in the digital image; and
  displaying, via the display device, a representation of the selected geometric shape without the object to approximate the entire outer border of the object as augmented reality digital content as part of a live stream of the physical environment captured by the camera.

18. The computing device as described in claim 17, wherein the user interface further includes an additional digital image and an additional option associated with an additional object included in the additional digital image, the additional option selectable to assess a fit of the additional object in the physical environment.

19. The computing device as described in claim 17, wherein the operations further comprise determining dimensions of at least a portion of the physical environment, wherein the displaying the representation of the selected geometric shape to approximate the entire outer border of the object as augmented reality digital content is based at least in part on the determined dimensions of the physical environment.

20. One or more computer-readable storage devices comprises instructions stored thereon that, responsive to execution by at least one processor of a computing device, perform operations comprising:
  displaying a user interface that includes a digital image and an option associated with an object included in the digital image, the option selectable to assess a fit of the object in a physical environment;
  receiving, via the user interface, an input selecting the option associated with the object;
  determining dimensions of the object included in the digital image;
  automatically selecting, based on the dimensions of the object included in the digital image, a geometric shape that approximates an entire outer border of the object included in the digital image; and
  displaying a representation of the selected geometric shape without the object to approximate the entire outer border of the object as augmented reality digital content as part of a live stream of the physical environment.

* * * * *